Jan. 27, 1942.  S. M. MARCUS ET AL  2,271,126
DIRECTION INDICATOR
Filed April 14, 1941  2 Sheets-Sheet 1

INVENTOR.
SAMUEL M. MARCUS.
JAMES A. ZINGHEIM.
BY
ATTORNEY.

Jan. 27, 1942.   S. M. MARCUS ET AL   2,271,126
DIRECTION INDICATOR
Filed April 14, 1941   2 Sheets-Sheet 2
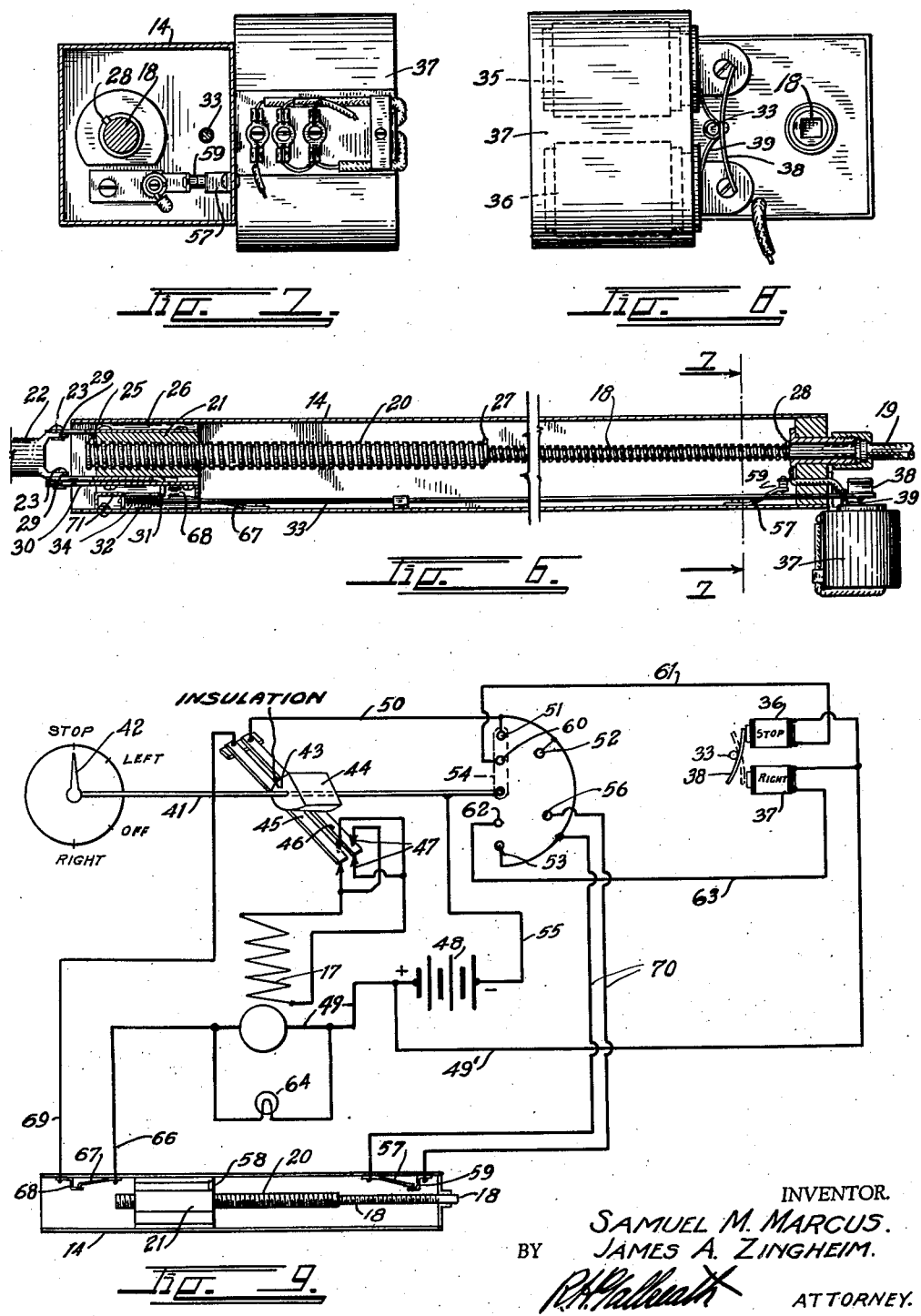
INVENTOR.
SAMUEL M. MARCUS.
JAMES A. ZINGHEIM.
BY
ATTORNEY.

Patented Jan. 27, 1942

2,271,126

UNITED STATES PATENT OFFICE 2,271,126

DIRECTION INDICATOR

Samuel M. Marcus and James A. Zingheim,
Denver, Colo.

Application April 14, 1941, Serial No. 388,452

5 Claims. (Cl. 177—327)

This invention relates to a direction indicator for automotive vehicles and has for its principal object the provision of a neat, simple device which will be entirely concealed when not in use; which can be quickly and easily operated to give three distinct signals at the will of the operator and by use of a single signal arm; and which will give a maximum signal movement for a minimum of length of mechanism.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 6 is a longitudinal section through the signal operating mechanism looking downwardly, illustrating the position of the mechanism when the signal arm is fully extended;

Fig. 7 is an enlarged cross section through the signal housing, taken on the line 7—7, Fig. 6;

Fig. 8 is an enlarged rear end view of the signal housing with the flexible drive shaft removed; and Fig. 9 is a circuit diagram illustrating the electrical circuits employed in the device.

Figure 1:
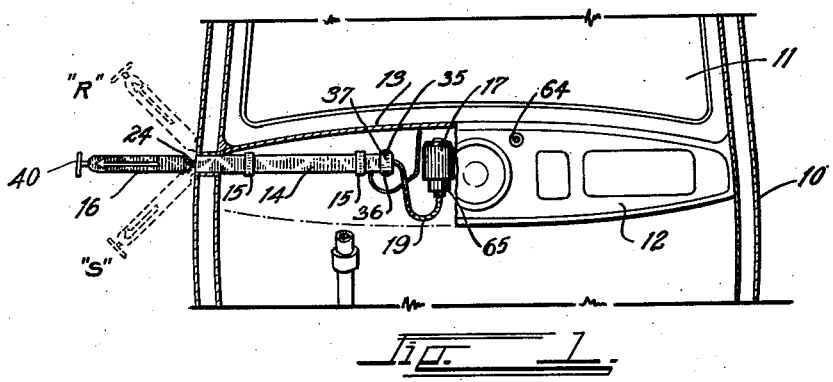
Fig. 1 is a diagrammatic cross sectional view through an automotive vehicle with the instrument board partially broken away to illustrate the position of the improved direction indicating mechanism.
Figure 2:
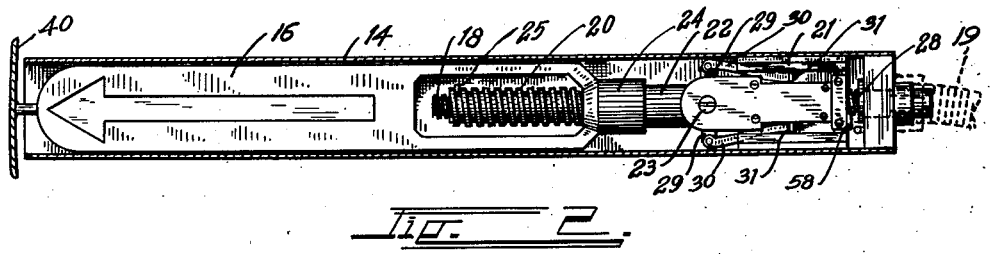
Fig. 2 is an enlarged view of the improved mechanism with the housing cut away to show the interior construction.

In Fig. 1, the body of an automobile is indicated in cross section at 10, the windshield thereof at 11, the instrument board at 12, and the cowl at 13.

The improved direction indicating mechanism can be placed at any desired position on any automotive vehicle but is preferably placed below the cowl 13 ahead of the instrument board so as to be entirely concealed, except when in use, and so that the signal arm will be visible to the driver when in use. The mechanism is normally contained within an elongated housing 14, preferably rectangular in cross section, which may be attached to the fire wall of the cowl 13 by means of suitable clamping members 15.

The signal indications are given by means of a signal arm 16 which is normally contained within the housing 14 and which is forced to a projected position or withdrawn into the housing by the operation of a reversible electric motor 17. The motor is connected to a threaded shaft 18, extending lengthwise of the housing 14, by means of a flexible shaft 19. A threaded tube 20 surrounds the threaded shaft. The tube is provided with internal threads, engaging the threads of the threaded shaft, and external threads which are threaded into a traveling carriage 21.

Thus, when the threaded shaft is rotated to the left, it rotates the threaded tube 20 to the left causing the latter to thread the carriage 21 outwardly therein. The carriage strikes a stop 25 at the extremity of the tube 20 and stops the rotation of the tube. The threaded shaft 18 then threads the tube outwardly carrying the carriage with it to the fully extended position. At the extreme outward extremity of the threaded shaft the thread therein is blocked and a second stop pin 27 extends into this thread to contact the block to prevent the tube 20 from unscrewing completely off the extremity of the shaft and to stop the shaft at the extreme outward limit.

By this arrangement, the carriage can be made to travel twice the length of the shaft 18 so that an exceedingly great length of movement is obtained for a minimum length of shaft. The inner extremity of the shaft terminates in a square socket coupling for receiving the extremity of the flexible motor shaft 19.

When the threaded shaft is rotated to the right, it first threads itself into the threaded tube 20 until the threaded tube strikes a third stop pin 28 on the threaded shaft. The threaded tube will then rotate with the shaft, threading the carriage back inwardly into the case, until the carriage strikes the second stop pin 27, when further rotation of the rotation of the threaded shaft is prevented.

To prevent damage to the motor 17, when the shaft is stopped, any suitable slipping friction clutch may be provided between the flexible shaft 19 and the shaft of the motor such as indicated on the drawings by the clutch housing 65 on the motor so that the motor may coast to a gradual stop after the mechanism has been stopped.

A hollow sleeve 22 is hingedly secured to the outer extremity of the carriage 21 by means of suitable hinge pivots 23. The signal arm 16 is formed on a hollow nipple 24 which is slipped over and secured on the sleeve 22. Thus the horizontal movements of the carriage are communicated to the signal arm 16. The carriage 21 is formed with projecting edge members 26 which slide in the corners of the housing 14 to prevent rotation of the carriage therein to maintain the signal always in its proper position.

The hinge pivots 23 are for the purpose of allowing the signal arm to be swung upwardly to indicate a "right" turn or downwardly to indicate a "stop" as indicated at "R" and "S," respectively in Fig. 1.

Figures 4, 5:
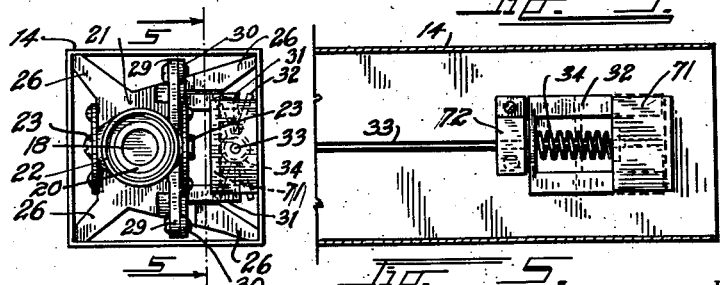
Fig. 4 is an end view looking in the direction of the arrow "4," Fig. 3.
Fig. 5 is a sectional view, taken on the line 5—5, Fig. 6, illustrating the tilting member which engages and operates the signal to its various positions.

The swinging of the signal arm is accomplished by means of two oppositely extending lever arms 29 secured to the sleeve 22 opposite the hinge pivots 23. A hooked arm 30 extends inwardly from each of these lever arms terminating in sideward projecting hooks 31. These hooks are positioned to alternately engage the opposite arms of a tilting member 32, as shown in Fig. 4. The tilting member is secured on a control rod 33 which is journalled in the housing 14.

Thus, if the tilting member is tilted to the right, the lower arm thereof will engage the lower hook 31 as the carriage moves outwardly. This stops that lever arm from moving further outward. Further movement of the carriage therefore forces the hooked arm to swing the sleeve 22 and the signal arm downwardly to the "stop" position.

Figure 3:
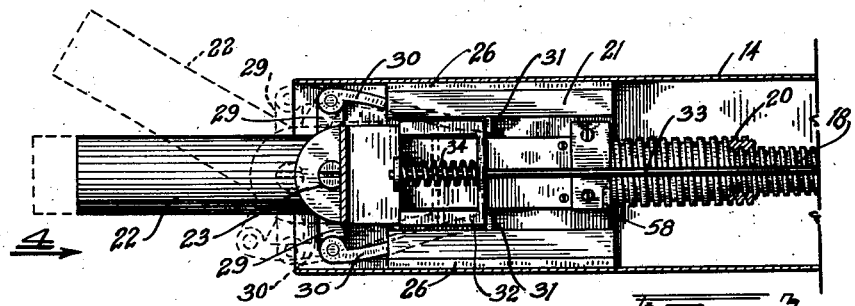
Fig. 3 is a still further enlarged, detail view illustrating the traveling carriage mechanism which carries the signal arm.

If the upper extremity of the tilting member 32 is swung to the left, in Fig. 4, it will be engaged by the upper hook 31 holding the latter stationary so that further outward movement of the carriage will swing the sleeve 22 and its signal arm upwardly, as shown in broken line in Fig. 3, to the "right" position.

If the tilting member is in a vertical position, it will engage both hooks 31 so as to hold the sleeve 22 and signal arm horizontal and further outward movement of the carriage will simply move the rod 33 outward compressing a compression spring 34.

Thus, the signaling position of the arm 16 is determined by the position of the tilting member 32 and the position of the latter is controlled through the operation of two electro-magnets 35 and 36 contained within a magnet housing 37 at one side of the inner extremity of the housing 14. These magnets act against a tilting armature 38 which is secured on the inner extremity of the control rod 33.

Thus, when the magnet 35 is energized, the upper extremity of the armature 38 will be drawn to the left in Fig. 8, tilting the lower extremity of the tilting member 32 to the left in Fig. 4, to cause the arm 16 to give a "stop" indication. When the magnet 36 is energized, the lower extremity of the armature 38 will be drawn to the left to turn the control rod 33 to tilt the upper extremity of the tilting member 32 to the left, in Fig. 4, so as to engage the upper hook 31 to cause the latter to swing the signal arm upward so as to give a "right" indication. Thus, by selective energizing of the magnets 35 and 36 any desired signal can be given. The armature 38 is normally held in the intermediate or "left turn" position by means of a balance spring 39.

When the arm 16 is completely indrawn into the housing both the threaded shaft 18 and the tube 20 extend completely through the sleeve 22 into the interior of the arm 16. The outer extremity of the arm carries a patch member 40 which closes the open outer extremity of the housing so that it will be almost invisible on the exterior of the automobile when not in use. The arm may be illuminated for night use in any desired manner.

The operation of the device will be described with reference to the wiring diagram of Fig. 9.

A suitable control switch is provided which may be located on the steering wheel, instrument board, or at any other convenient place. This switch is shown diagrammatically in Fig. 9 and comprises a switch shaft 41 terminating at its outer extremity in an indicating pointer 42 which can be turned to any of the four indications—"stop," "left," "off," and "right."

The shaft carries a cam member 43, of suitable electrical insulating material, provided with a flat side 44. Two reversing switch blades 45 and 46 bear against the cam member 43. The extremities of the blades are positioned between four suitably connected, motor reversing contacts 47 which are in circuit with the field circuit of the motor 17. The flat side 44 on the cam 43 is so positioned that it will allow the two reversing switch blades 45 and 46 to rise when the indicator is opposite the "off" position to reverse the motor to retract the signal arm.

The current is supplied from the regular car battery, diagrammatically indicated at 48, one terminal of which leads to a conductor 49 connected to an armature brush of the motor 17. The other armature brush is connected to an outer limit switch spring 67 through a conductor 66. The switch spring normally contacts a contact 68 from which a conductor 69 leads to the reversing switch blade 45. The other switch blade 46 is connected through a conductor 50 to three motor-starting contacts 51, 52, and 53, respectively, corresponding to the "stop," "left," and "right" positions of the indicator 42. A radial contact arm 54 is secured on the switch shaft 41 and swings into contact with the motor starting contacts.

The other terminal of the batery 48 is connected by means of a conductor 55 to the contact arm 54. A fourth motor-starting contact, which we will designate as the reversing contact 56, is also positioned in the path of the arm 54. The latter contact is in circuit with the conductor 50 through a pair of conductors 70 leading through an inner limit switch. The limit switch consists of a spring blade 57 against which, a switch opening member 58 on the carriage strikes when the carriage has reached its fullest indrawn position so as to separate a pair of limit contacts 59.

A "stop" contact 60 is placed in the path of the arm 54 to be simultaneously contacted with the contact 51. The "stop" contact is in circuit with the "stop" electro-magnet 36 through a suitable conductor 61. A "right" contact 62 is also positioned in the path of the arm 54 opposite the contact 53 to be simultaneously contacted therewith. The "right" contact is in circuit through a conductor 63 with the "right" electro-magnet 35. Both electro-magnets are in circuit with the battery 48 through the conductor 49'.

*Operation*

Let us assume that the indicator is turned to "stop," as shown in Fig. 9. Current will flow from the positive side of the battery through the conductors 49 and 49' to the magnets 36 and to the armature of the motor from thence through the outer limit switch members 67 and 68 and conductor 69 to the switch blade 45 thence through the motor field, thence through conductor 50, contact 51, arm 54, and the conductor 55 to the negative pole of the battery. This starts the motor and the latter rotates the threaded shaft to the left forcing the carriage and signal arm outwardly. A circuit is simultaneously closed to the contact 60 and through the conductor 61 to the "stop" magnet 36, thus, magnetically moving the tilting member 32 into the path of the lower hook 31 to swing the arm 16 downwardly as it exits from the housing. As the carriage reaches the extremity of its outward movement, the carriage forces the blade 67 from the contact 68 and stops the motor.

To return the arm, the indicator 42 is swung to the "off" position. This closes a circuit to the motor through the contact 56 and the limit switch 57—59. It also brings the flat side of the cam 44 over the blades 45 and 46 allowing them to rise to the upper contacts 47 to reverse the motor so as to rotate the threaded members to the right to draw the carriage inwardly. When the carriage reaches its extreme inward position, the switch opening member 58 will strike the limit blade 57 opening the contacts 59 and breaking the circuit to the motor allowing the latter to come to rest.

If the indicator 42 is now turned to the "left" indication, the cam will bring the reversing blades 45 and 46 to their original position, the motor will start but no contacts will be closed to the magnets 35 and 36 so that the tilting member will remain vertical and the arm will project straight out as it exits.

If the indicator 42 is turned to the "right" position, the motor will be started forwardly through the contact 53 and the "right" magnet 35 will be energized through the contact 62, to tilt the tilting member 32 out of the path of the lower hook 31 to allow the upper hook to swing the arm upwardly as it exits.

It will be noted that the tilting member comprises a U-shaped yoke with its legs directed toward the open extremity of the housing. When the member is vertical, that is, in the "left turn" position, both these legs slide behind a stop plate 71 as the control shaft moves forward under the influence of the two hooks 31. If the tilting member is tilted to the left or right however one or the other legs of the tilting member strikes the edge of the stop plate and prevents the former from moving forward so that the engaged hook 31 is definitely stopped.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A direction indicator for vehicles comprising: a horizontally positioned, elongated housing having an open outer extremity; a carriage member in said housing; means for moving said carriage member longitudinally of said housing as desired; a signal supporting member horizontally pivoted on said carriage member to project outwardly therefrom; a signal member extending from said supporting member; arms extending upwardly and downwardly from said supporting member; hook members extending from said arms; a tilting member lying normally across the paths of both said hook members; and means for tilting said tilting member out of the path of either hook member so that it will engage and limit the outward movement of the other hook member to allow the latter to tilt said supporting member as said carriage moves outwardly.

2. A direction indicator for vehicles comprising: a horizontally positioned, elongated housing having an open outer extremity; a carriage member in said housing; means for moving said carriage member longitudinally of said housing as desired; a signal supporting member horizontally pivoted on said carriage member to project outwardly therefrom; a signal member extending from said supporting member; arms extending upwardly and downwardly from said supporting member; hook members extending from said arms to one side of said supporting member; a tilting member pivoted intermediate its extremities between the paths of said hook members; an armature connected with said tilting member; a pair of electro-magnets for tilting said armature to cause either desired extremity of said tilting member to swing out of the path of its hook member to allow the other hook member to swing said supporting member upward or downward as described as it exits from said housing.

3. A direction indicator for vehicles comprising: an elongated housing having an open outer extremity; a threaded shaft projecting longitudinally inwardly from the inner extremity of said housing; a threaded sleeve threaded on said threaded shaft for substantially its entire length and having both internal and external threads; a traveling carriage threaded on the external threads of said sleeve; a signal supporting member on the outer extremity of said carriage; and means for rotating said shaft in said sleeve and said sleeve in said carriage in either desired direction.

4. A direction indicator for vehicles comprising: an elongated housing having an open outer extremity; a traveling carriage in said housing; means for moving said carriage longitudinally of said housing; a signal supporting member hinged on the outer extremity of said carriage; a signal device carried by said supporting member; arms extending upwardly and downwardly from said supporting member; hooked levers attached to said arms; a tilting member; means for tilting said tilting member to place it in the path of either or both of said levers, said tilting member being free to move with said levers when in engagement with both; and means to prevent movement of said tilting member when in engagement with either of said levers.

5. A direction indicator for vehicles comprising: an elongated housing having an open outer extremity; a threaded shaft projecting longitudinally inwardly from the inner extremity of said housing; a threaded sleeve threaded on said threaded shaft for substantially its entire length and having both internal and external threads; a traveling carriage threaded on the external threads of said sleeve; a signal supporting member on the outer extremity of said carriage; means for rotating said shaft in said sleeve and said sleeve in said carriage in either desired direction; and means for swinging said signal supporting member as it exits from the open outer extremity of said housing.

SAMUEL M. MARCUS.
JAMES A. ZINGHEIM.